(12) United States Patent
Zunzer et al.

(10) Patent No.: US 11,577,594 B2
(45) Date of Patent: Feb. 14, 2023

(54) ROOF ASSEMBLY FOR A VEHICLE ROOF HAVING A ROOF OPENING

(71) Applicant: Webasto SE, Stockdorf (DE)

(72) Inventors: Andreas Josef Zunzer, Stockdorf (DE); Stefan Schäufler, Stockdorf (DE)

(73) Assignee: Webasto SE, Stockdorf (DE)

( * ) Notice: Subject to any disclaimer, the term of this patent is extended or adjusted under 35 U.S.C. 154(b) by 20 days.

(21) Appl. No.: 17/242,451

(22) Filed: Apr. 28, 2021

(65) Prior Publication Data
US 2021/0339612 A1 Nov. 4, 2021

(30) Foreign Application Priority Data

Apr. 30, 2020 (DE) .......................... 102020111812.0
Apr. 20, 2021 (DE) .......................... 102021109938.2

(51) Int. Cl.
| | | |
|---|---|---|
| *B60J 10/30* | (2016.01) | |
| *B60J 10/25* | (2016.01) | |
| *B60J 10/82* | (2016.01) | |
| *B60J 7/02* | (2006.01) | |

(52) U.S. Cl.
CPC ................. *B60J 10/30* (2016.02); *B60J 7/02* (2013.01); *B60J 10/25* (2016.02); *B60J 10/82* (2016.02)

(58) Field of Classification Search
CPC ... B60J 10/00; B60J 10/25; B60J 10/30; B60J 10/82; B60J 10/87; B60J 10/90; B60J 10/246; B60J 7/02; B60J 7/43
USPC ............ 296/216.06, 216.07, 216.08, 216.09; 277/534, 540, 935, 944; 49/475.1, 476.1, 49/489.1, 498.1
See application file for complete search history.

(56) References Cited

U.S. PATENT DOCUMENTS

| | | | |
|---|---|---|---|
| 6,334,646 B1 | 1/2002 | Oami | |
| 7,651,159 B2 | 1/2010 | Radmanic et al. | |
| 2001/0033097 A1* | 10/2001 | Nozaki | B60J 10/82 296/216.09 |

(Continued)

FOREIGN PATENT DOCUMENTS

| | | |
|---|---|---|
| DE | 10022020 A1 | 2/2001 |
| DE | 102005033276 B3 | 10/2006 |

(Continued)

OTHER PUBLICATIONS

Kagotani et al., "Weather Strip", Jan. 12, 2006, Japanese Patent Office, Edition: JP-2006007888-A (Year: 2006).*

(Continued)

*Primary Examiner* — Dennis H Pedder
*Assistant Examiner* — Joyce Eileen Hill
(74) *Attorney, Agent, or Firm* — Fitch, Even, Tabin & Flannery, LLP

(57) ABSTRACT

A roof assembly for a vehicle roof having a roof opening may have a movable roof element for optionally closing and at least partially uncovering the roof opening, a strand-shaped sealing profile which is adapted on a sealing side for sealing against the movable roof element and can be fastened to a fastening side on the vehicle roof. The sealing profile may have a sealing tube which is elongated along a longitudinal axis (X) and which surrounds a hollow chamber, and a recess which extends transversely to the longitudinal axis (X) through the sealing tube, such that the fastening side is fluid-connected to a side of the sealing tube facing away from the fastening side.

14 Claims, 6 Drawing Sheets

(56) References Cited

U.S. PATENT DOCUMENTS

Figure 1:
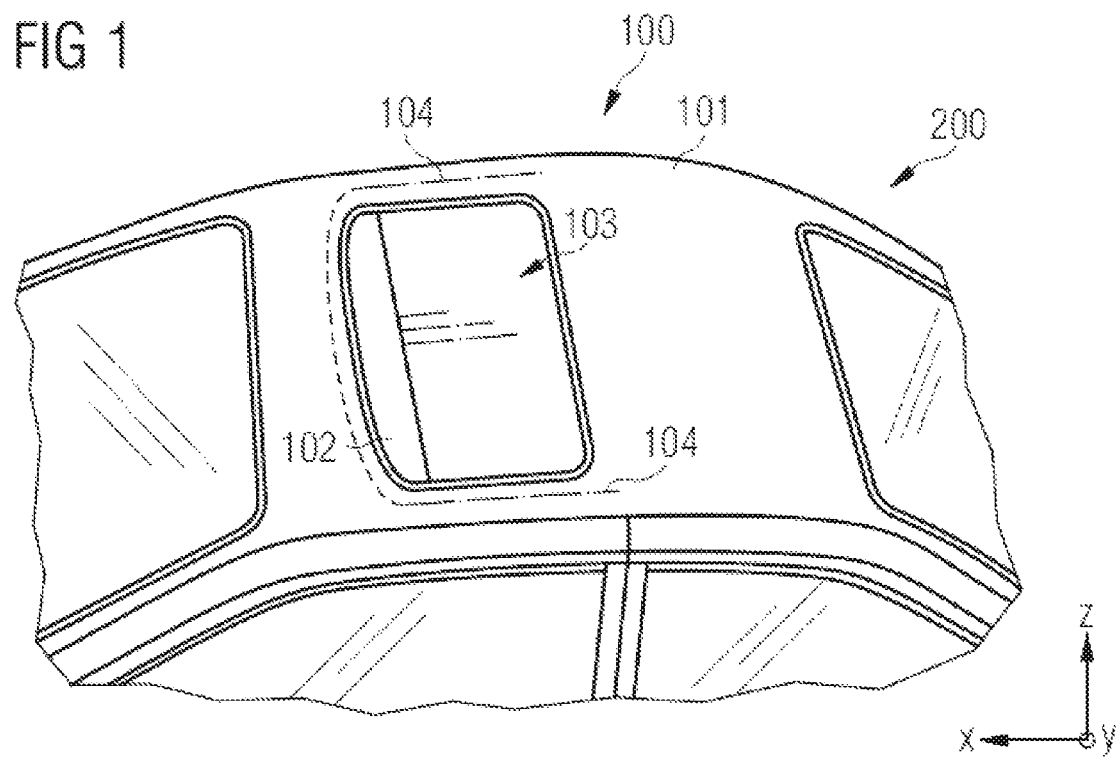

| | | |
|---|---|---|
| 2006/0055211 A1 | 3/2006 | Mack et al. |
| 2008/0217964 A1* | 9/2008 | Katayama ................ B60J 10/24 |
| | | 296/213 |
| 2009/0115227 A1* | 5/2009 | Radmanic .............. B60J 10/248 |
| | | 296/213 |

FOREIGN PATENT DOCUMENTS

| | | | | |
|---|---|---|---|---|
| DE | 102016112579 B3 * | 8/2017 | ............ | B60J 10/248 |
| DE | 102016112579 B3 | 8/2017 | | |
| JP | 2006007888 A * | 1/2006 | .............. | B60J 10/12 |
| JP | 2006-027369 A | 2/2006 | | |

OTHER PUBLICATIONS

Sommer, "Strand-shaped Sealing Profile And Roof Arrangement", Aug. 17, 2017, German Patent Office, Edition: DE102016112579B3 (Year: 2017).*

* cited by examiner

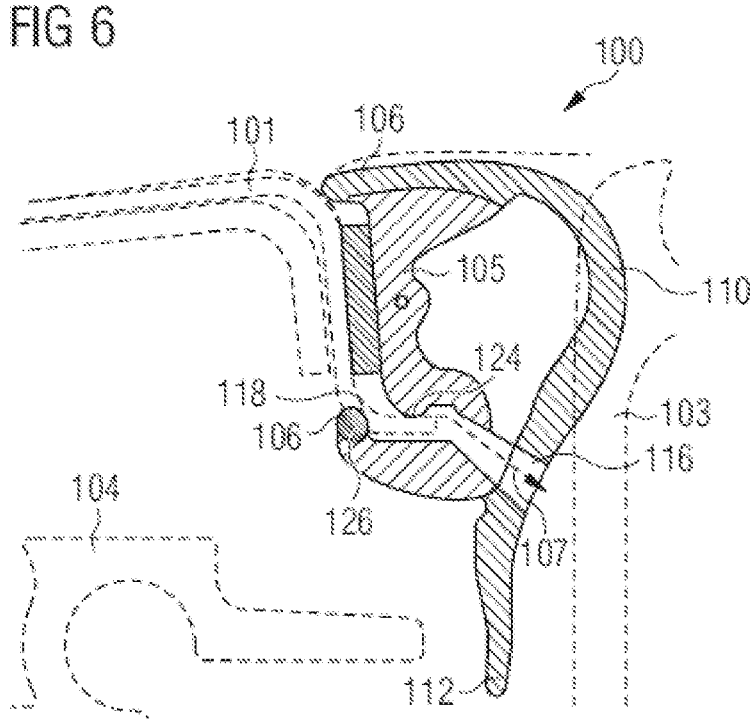
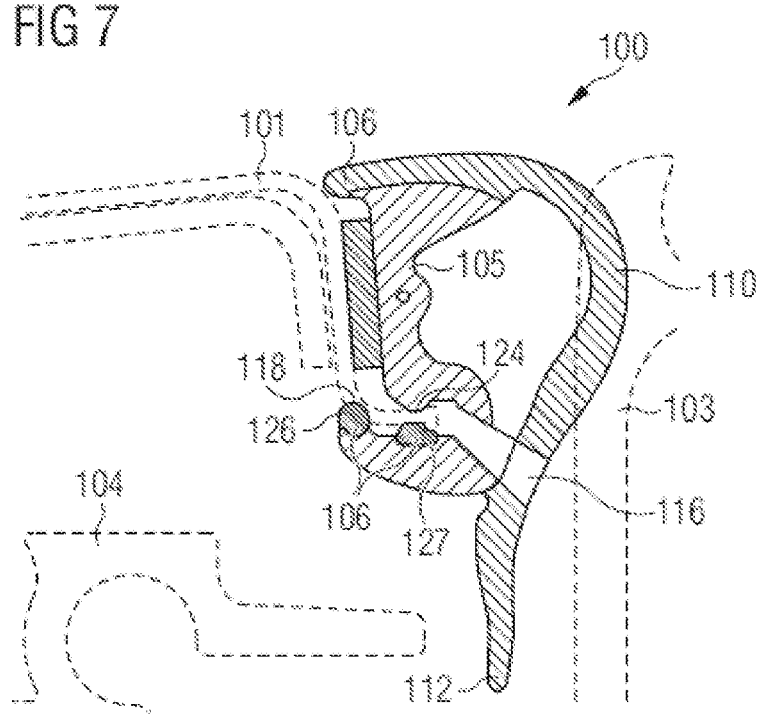

ROOF ASSEMBLY FOR A VEHICLE ROOF HAVING A ROOF OPENING

CROSS-REFERENCE TO RELATED APPLICATION

This application claims priority from German Patent Application Number DE 102020111812.0, filed Apr. 30, 2020, and German Patent Application Number DE 102021109938.2 filed Apr. 20, 2021, which are hereby incorporated herein by reference in their entirety for all purposes.

FIELD

The disclosure relates to a roof assembly for a vehicle roof, particularly for a vehicle roof with a movable roof element. The disclosure also relates to a vehicle roof having such a roof opening.

BACKGROUND

A vehicle roof of a motor vehicle can have a roof opening which is closed, and optionally at least partially uncovered, by a movable roof element. For example, a seal is provided for sealing the vehicle roof with the movable roof element. This seal is intended to prevent water from penetrating into a dry area of the vehicle roof or of the motor vehicle.

SUMMARY

It is desirable to provide a roof assembly that enables reliable sealing. It is also desirable to provide a vehicle roof having such a roof assembly that can be reliably sealed.

According to one aspect, a roof assembly for a vehicle roof has a movable roof element. The vehicle roof has a roof opening. The movable roof element is adapted to either close the roof opening or to open it at least partially. The roof element is held, for example, by a frame of the roof assembly, which is initially formed separately from the vehicle roof. The roof assembly has a strand-shaped sealing profile. The sealing profile is adapted on a sealing side for sealing against the movable roof element. The sealing profile can be fastened to a fastening side on the vehicle roof. The sealing profile has a sealing tube which is elongated along a longitudinal axis. The sealing tube surrounds an interior space, which is also referred to as a hollow chamber. The sealing profile has a recess which extends transversely to the longitudinal axis through the sealing tube, such that the fastening side is fluid-connected to the sealing side.

The sealing profile is adapted for sealing against the movable roof element and can be fastened to the vehicle roof. In the ready-to-use state, the sealing profile is provided for sealing against the vehicle roof and is fastened to the vehicle roof. Particularly, the sealing profile is adapted to be arranged between the vehicle roof and the movable roof element in its closed position and to provide a tight seal between the vehicle roof and the movable roof element. The sealing profile is fixed or fixable in the ready-to-use state on the component against which it is also intended to seal.

For example, the sealing profile is only glued to the vehicle roof or the body shell when the vehicle is manufactured. The sealing profile thus serves as an interface and seal between the roof assembly and the vehicle roof. Non-adhesive defects can occur where, for example, the gluing does not fully adhere to the vehicle roof, particularly during gluing. Accordingly, it is possible that this connection area between the sealing profile and the vehicle roof is not sufficiently watertight. If water penetrates, a water path can be formed that can extend into the interior of the vehicle. It is conventionally possible for this water to get into the dry area of the vehicle roof, for example. It is thus conventionally possible, for example, for an inner lining of the roof assembly or of the vehicle to be undesirably moistened by penetrating water.

The roof assembly according to the present disclosure has the recess through which penetrating water can be drained in a controlled manner. Water that penetrates the fastening side during operation due to insufficient fastening of the sealing profile to the vehicle roof is drained through the recess towards the sealing side. On the sealing side, the penetrating water can be conducted and drained in a controlled manner in a water duct of the roof assembly. Thus, the recess is used to prevent that water which penetrates undesirably on the fastening side of the sealing profile, gets into the dry area of the roof assembly or of the vehicle. The recess which is provided in the sealing profile, for example by means of drilling, thus establishes a connection or also a duct from the vehicle roof or the body shell to the water-draining area of the roof assembly.

By means of the controlled, canalized drainage through the recess, the water that is introduced by an improperly executed fastening of the sealing profile is conducted specifically into a water-draining area. This prevents this water from moving into the dry area and reaching other water-sensitive areas in an undefined manner. The overall robustness and reliability of the roof assembly is thus increased, even if the sealing profile is incorrectly fastened.

According to at least one embodiment, the recess is fluid-connected to the hollow chamber. Thus, the hollow chamber can be vented at the same time by means of the recess, for example when the sealing profile or the sealing tube is compressed. The reduction in volume due to compression or the increase in volume when the sealing tube is released can thus easily be implemented fluidically by means of the recess. The recess thus fulfills a double function: on the one hand, the recess is used to drain the penetrating water and, on the other hand, as an air duct to discharge air from the interior of the hollow chamber or to allow air to penetrate into the hollow chamber.

According to at least one embodiment, the recess is configured to be inclined away from the hollow chamber, starting from the fastening side. In this way, it is possible to prevent water flowing off from entering the hollow chamber. In addition, a sloping incline of the recess is implemented in the operational state. As a result, the water reliably flows in the direction of the sealing side. The inclination of the recess can also be configured just partially, and the recess has differing inclinations in different regions according to respective embodiments. It is also possible for the recess has the same inclination over its entire length.

According to at least one embodiment, the sealing profile has a drip lip on the sealing side. The drip lip is, for example, configured to project longitudinally in order to form a reliable transition to the water-conducting channel. The recess is formed between the drip lip and the hollow chamber. Water that penetrates the fastening side is conducted through the recess to the top of the drip lip. The drip lip is configured to reliably conduct water that penetrates the sealing side into the water-conducting channel. In addition, due to the arrangement of the recess above the drip lip, the drip lip is also suitable for reliably guiding water that comes out of the recess to the water guiding channel.

According to at least one embodiment, the sealing profile has a plug-in area on the fastening side. The plug-in area is used to attach the sealing profile to the vehicle roof by means of a plug-in connection. The recess is formed between the plug-in area and the sealing side and extends between the plug-in area and the sealing side. Particularly, the plug-in area is so strongly biased that water penetrating during operation is conducted along the plug-in connection in the areas in which no recess is provided. In this way, the water is conducted along the plug-in areas to the recess and drained there in a controlled manner.

According to at least one embodiment, the sealing profile has an adhesive surface. The first sealing profile can be fastened to the vehicle roof on the adhesive surface by means of an adhesive bond. The recess extends between the adhesive surface and the sealing side. Particularly, both the plug-in area and the adhesive surface are provided. During operation, the sealing profile can be fastened to the roof assembly both by means of the plug connection and by means of the adhesive bond. For example, the sealing profile is first pre-fixed to the vehicle roof by means of the plug connection and then glued by means of the adhesive bond, for example by means of double-sided adhesive tape or some other type of gluing. The plug connection is also used, for example, to conduct water along the longitudinal extension of the sealing tube up to the recess.

According to at least one embodiment, the sealing profile has a plurality of recesses. Particularly, the recesses are all designed in accordance with at least one of the embodiments described herein. For example, the recesses are all designed in the same way. It is also possible for the individual recesses to be designed differently from one another, for example depending on the arrangement along the sealing profile or the intended arrangement relative to the vehicle roof. For example, the recesses are at a distance of 300 mm from one another. Different distances between the individual recesses are also possible and, particularly, larger or smaller distances of, for example, 100 mm. For example, after the sealing tube has been produced, the recesses are subsequently drilled by means of an extrusion process. It is also possible for the recesses to be made during the extrusion, for example by means of technical devices of the extrusion tool, such as flow channel gate valves.

According to at least one embodiment, a vehicle roof has a roof assembly according to at least one of the embodiments described herein. The strand-like sealing profile is fastened to the vehicle roof, particularly glued, and separates a dry area of the vehicle roof from a wet area. The recess extends between the dry area and the wet area. It is thus possible to drain water into the wet area by means of the recess before it spreads in an uncontrolled manner in the dry area.

According to at least one embodiment, the sealing profile is fastened to the vehicle roof by means of an adhesive bond. The adhesive bond is, for example, a physical separation between the dry area and the wet area. The adhesive bond forms the fastening of the sealing profile to the vehicle roof or the shell.

Alternatively or additionally, according to at least one embodiment, the sealing profile is fastened to the vehicle roof by means of a plug connection. The plug connection also is used to seal between the dry area and the wet area and for the controlled drainage of water from the dry area into the wet area.

Further advantages, features and developments result from the following examples explained with reference to the figures.

BRIEF DESCRIPTIONS OF THE DRAWINGS

Figure 2:
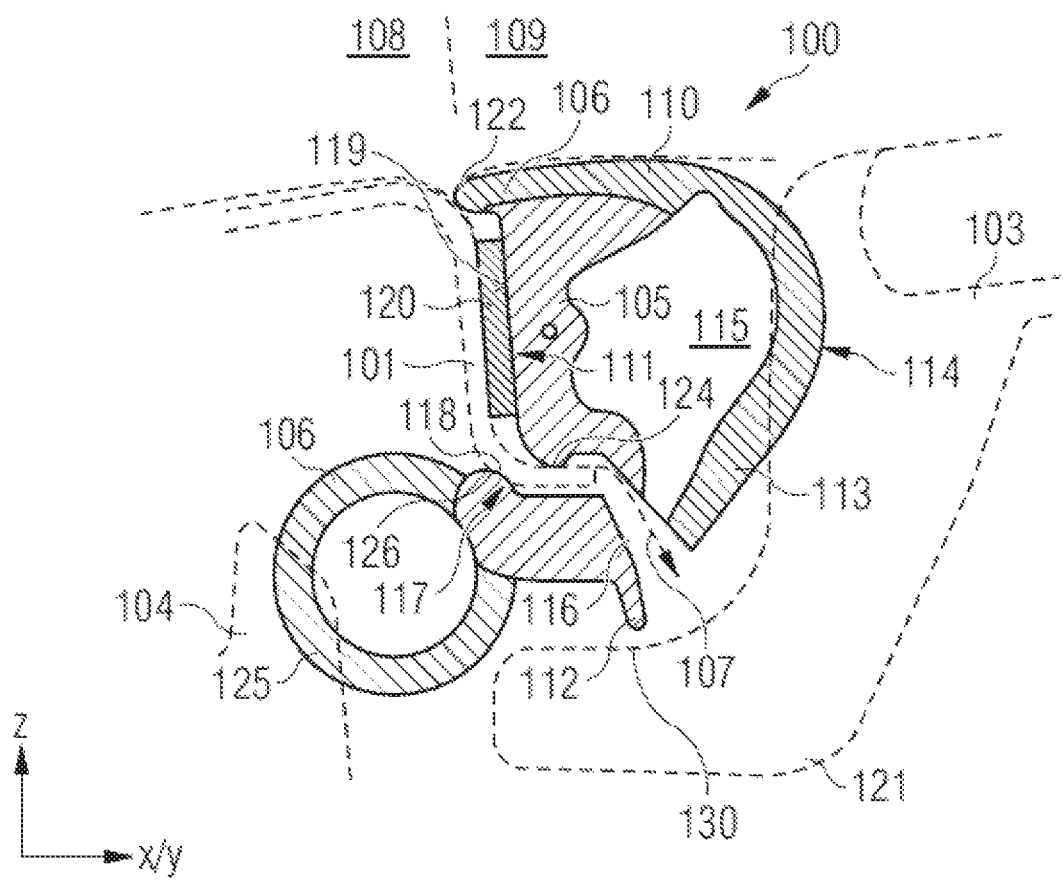
Figure 3:
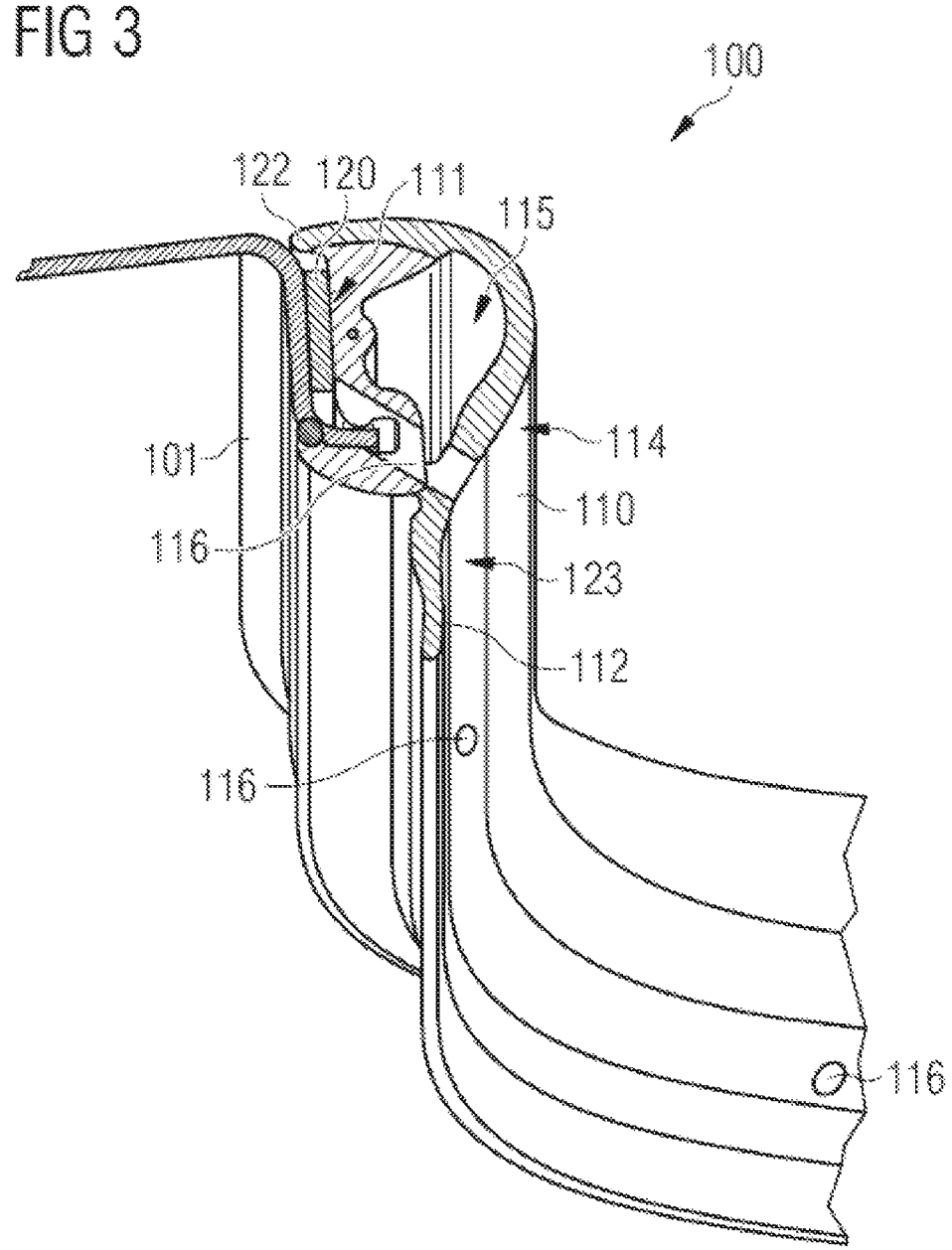

Identical, similar, and similarly acting elements can be provided with the same reference numerals in the figures. Wherein:

FIG. 1 is a schematic view of a vehicle roof according to an exemplary embodiment, FIG. 2 is a schematic cross-sectional view of a roof assembly according to an exemplary embodiment, FIG. 3 is a schematic perspective view of the roof assembly according to an exemplary embodiment, and FIGS. 4 to 9 each show schematic cross-sectional views of the roof assembly according to different exemplary embodiments.

DETAILED DESCRIPTION

FIG. 1 shows a vehicle roof 101 of a motor vehicle 200. The vehicle roof 101 is particularly the vehicle-mounted roof, which is also called the roof skin and is, for example, part of the shell of the motor vehicle 200. The vehicle roof 101 surrounds a roof opening 102. The roof opening 102 is optionally closed or at least partially uncoverable by means of a movable roof element 103 which is movable along a direction x.

The movable roof element 103, also called a cover, is held by a frame 104. The frame 104 has guide rails, for example, which are fastened to the vehicle roof 101 on both sides of the roof opening 102. The frame particularly has further elements which are arranged, for example, transversely to the x direction along a front side of the roof opening 102. The frame 104 is used particularly to guide the movement of the roof element 103 and to hold further elements such as drive motors and/or cables. The roof element 103 and the frame 104 are particularly part of a roof assembly 100 which can be used as an independent assembly with the vehicle roof 101.

FIG. 2 shows a schematic sectional view of the roof assembly 100 according to an exemplary embodiment. In addition to the roof element 103 and the frame 104, the roof assembly 100 has a strand-shaped sealing profile 110. The sealing profile 110 has a main extension direction which is elongated and along which the sealing profile 110 is configured significantly longer than along the two directions transverse thereto. For example, the elongated sealing profile 110 along the front side of the roof opening 102 is extended significantly longer in the y direction than in the z and x directions. Particularly, the directions x, y and z are each perpendicular to one another.

The first sealing profile 110 is used to seal the movable roof element 113 with respect to the vehicle roof 101. When the vehicle roof 101 is closed, that is to say, when the roof element 103 is completely arranged in the roof opening 102, the sealing profile 110 largely seals the transition between the vehicle roof 101 and the roof element 103.

The sealing profile 110 has a sealing tube 113. The sealing tube 113 surrounds a hollow chamber 115. The hollow chamber 115 is filled with air or another fluid, for example. In the closed position of the roof element 113, the sealing tube 113 is, for example, in contact with the roof element 103 and the vehicle roof 101. The sealing tube has a fastening side 111 which faces the vehicle roof 101. The sealing tube 113 has a sealing side 114 which faces the roof element 103. The fastening side 111 and the sealing side 114 are arranged opposing one another and opposite one another. The sealing side 114 is formed on a side 140 of the sealing tube 113 facing away from the fastening side 111. The area of the sealing profile 110 on the fastening side 111 is formed from a solid 105, for example. Exemplary materials are EPDM, foam rubber, NBR, or silicone rubber. On the sealing side 114, the sealing profile is formed from a softer material, for example from foam rubber 106. Other rubber materials, rubber-type or rubber-like materials can also be used, for example foamed materials.

On the fastening side 111, the sealing profile 110 is fastened to the vehicle roof 101 by means of an adhesive bond 120. The adhesive bond is particularly formed on an adhesive surface 119 of the sealing profile 110 and on an opposite, corresponding contact surface of the vehicle roof 101. The adhesive bond is formed, for example, by means of an adhesive tape or some other type of gluing. The adhesive bond 120 is particularly formed in a plane, the main extension of which is in the z-direction.

The sealing profile 110 comprises a plug-in area 117. A plug connection 118 with the vehicle roof 101 can be formed by means of the plug-in area 117. The sealing profile can thus be fastened to the vehicle roof 101 both by means of the plug connection 118 and by means of the adhesive bond 120. For example, the plug connection 118 is used for preliminary fixing until the sealing profile 110 is glued on. In the normal operating position of the vehicle 101, the adhesive bond 120 is formed in the z-direction above the plug connection 118.

A recess 116 is made in the sealing profile 110 and particularly the sealing tube 113 along the x or y direction, depending on whether the sealing profile 110 is arranged along the front side or along the x direction to the side of the roof opening 102. According to embodiments, a plurality of similarly configured recesses 116 are introduced, which are spaced apart from one another (see also FIG. 3).

The recess 116 is produced, for example, by means of drilling or is formed repeatedly during the extrusion of the sealing tube 113. The recess is surrounded by the sealing tube 113 such that it extends from the sealing side 114 to the plug-in area 117 and, if applicable, to the adhesive bond 120. The recess forms a channel between the adhesive surface 119 and the sealing side 114, which channel is designed for fluid communication between the adhesive surface 119 and the sealing side 114. The recess 116 is configured such that liquids and gases can pass through the recess 116, particularly from the vehicle roof 101 and the fastening side 111 to the sealing side 114 and a water-conducting channel 130. The recess 116 is designed in such a way that water can pass through it from the adhesive surface 119 or the fastening side 111 to the sealing side 114. The recess has, for example, a diameter of more than 0.1 mm up to 5 mm, particularly a diameter of 1 mm, 1.5 mm, or 2 mm.

The recess 116 is configured to be inclined at least in sections relative to the horizontal plane. One end of the recess 116 facing the fastening side 111 is located higher in the z direction than an end of the recess 116 facing the sealing side 114. The recess 116 is thus formed sloping towards the sealing side 114.

When viewed from above, the adhesive bond 120 is initially arranged along the z-direction. The plug connection 118 is arranged below, then the recess 116 follows. The recess 116 is arranged below the hollow chamber 115 along the z-direction.

A drip lip 112 is provided below the recess 116 on the sealing side. The drip lip 112 is used for the controlled dripping of water into the water-conducting channel 130. The water-conducting channel 130 is formed, for example, on a cover frame 112, for example a foam cover, of the roof element 113. The water-conducting channel 130 can also be formed on the frame 104.

During operation, a free end 122 of the sealing tube 113 seals the sealing profile 110 on the upper side with respect to the vehicle roof 101. Proper gluing of the sealing profile 110 to the vehicle roof 101 is necessary for this. If the seal at the free end 122 is not one hundred percent tight, water 107 can get between the vehicle roof 101 and the sealing profile 110. This water can then reach the plug connection 118 along the fastening side 111 and the adhesive surface 119. There the water is then conducted to the recess 116.

The water passes through the recess 116 from the plug connection 118 to the drip lip 112. From there, the water then arrives in a controlled manner in the water-conducting channel 130 and can be drained in a further controlled manner. Water 107 that undesirably reaches a dry area 108 is thus drained off in a controlled manner into a wet area 109 by means of the recess 116. Particularly, the seal on the plug connection 118 is so strong that the water cannot penetrate the plug connection 118, but is conducted along the plug connection 118 towards the recess 116. At the plug connection 118, the sealing profile 110 is pressed strongly against the vehicle roof 101. At the recess 116, the water can also be conducted through the plug connection 118. The penetrating water 107 is branched off above the drip lip 112 and fed in an orderly manner to the regular water management system of the roof assembly 100.

The recess 116 is formed between the drip lip 112 and the hollow chamber 115 of the sealing tube 113 along the z-direction. The recess 116 is provided, for example, in such a way that there is a connection between the hollow chamber 115 and the recess 116. Fluid, for example air, can thus be blown out of the hollow chamber 115 through the recess 116 or let into the hollow chamber 115. This can be particularly advantageous if the sealing tube 113 is compressed when the roof element 103 is closed.

According to exemplary embodiments, the sealing profile 110 can have other sealing tubes or sealing elements, for example the other sealing tube 125. This tube is also formed from a soft foam rubber, for example, and is used to seal against the frame 104 below the vehicle roof 101. A nose 126, which is part of the plug connection 118, is formed on the further sealing tube 125. In the exemplary embodiment shown, the nose 126 is formed from the solid 105 and is harder than the foam rubber 106. In a comparable manner, another nose 124 is formed on the first sealing tube 113 at the plug-in area 117. The noses 124, 126 are each part of the plug connection 118. In the exemplary embodiment shown, the nose 124 is likewise formed from the solid 105 and is harder than the foam rubber 106.

FIG. 3 shows a perspective view of the roof assembly 100. The sealing tube 113 is fastened to the vehicle roof 101 by means of the adhesive bond 120 and the plug connection 118. Recesses 116 are provided along the elongated extension of the sealing tube 113, which recesses connect the fastening side 111 to the sealing side 114, such that water 107 that reaches the adhesive bond 120 can be conducted in a controlled manner through the sealing tube 113 to the drip lip 112. Continuous regions 123, in which no recess 116 is formed, are arranged between the individual recesses 116. In the continuous areas 123, the sealing tube 113 completely surrounds the cross section of the hollow chamber 115, and no connection is formed through the sealing tube 113 between the fastening side 111 and the sealing side 114.

The individual distances between the recesses 116 are, for example, in the range of 300 mm or more or less, for example 500 mm, 400 mm, 300 mm, 200 mm, or 100 mm. The distances can also be different, such that individual recesses 116 are arranged closer to the respective directly adjacent recess 116 than others.

Figure 4:
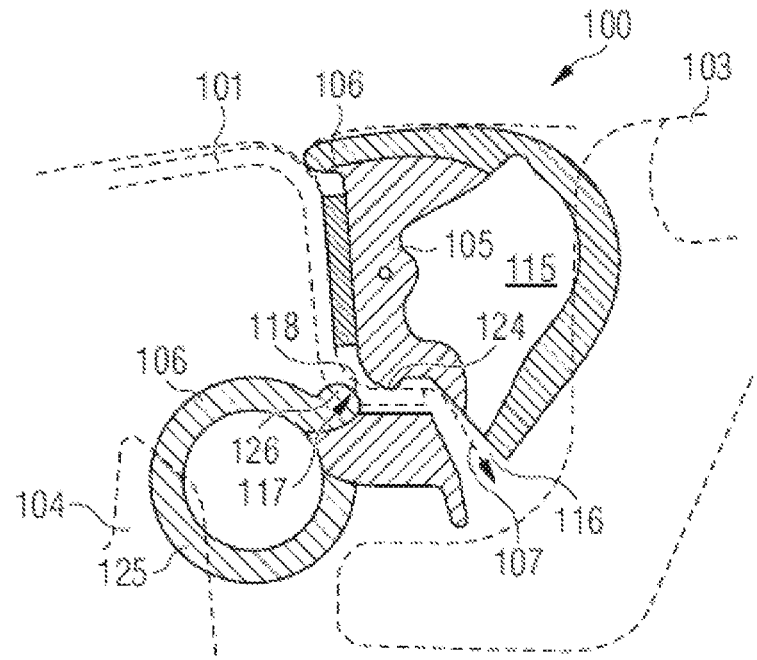

FIG. 4 shows the roof assembly 100 according to another exemplary embodiment. The exemplary embodiment according to FIG. 4 is essentially based on the roof assembly as explained in connection with FIG. 2. In contrast, the nose 126 on the second sealing tube 125 is formed from the softer foam rubber 106. This is useful, for example, for improved sealing towards the vehicle roof 101.

Figure 5:
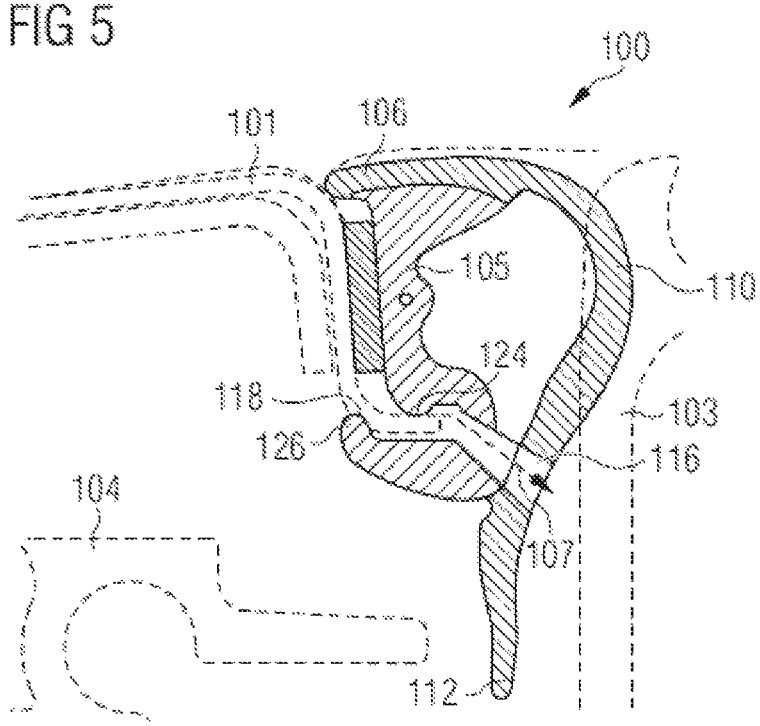

FIG. 5 shows the roof assembly 100 according to another exemplary embodiment. The roof assembly 100 according to FIG. 5 essentially corresponds to the exemplary embodiment as explained in connection with FIG. 2. However, no second sealing tube 125 is provided. Instead, the drip lip 112 is configured significantly longer and extends particularly along the z-direction from the recess 116 to at least over the upper edge of the frame 104. The water is thus reliably conducted out of the recess 116 via the drip lip 112 into the water-conducting channel 113, and penetration into the drying area 108 on the frame 104 can be prevented even without the second sealing tube 125. The two noses 124, 126 of the plug connection 118 are formed from the hard solid 105.

As shown in FIG. 6, it is also possible in the exemplary embodiment according to FIG. 5 to form the nose 126, which presses from below in the z direction against the vehicle roof 101, from the softer foam rubber 106.

In the exemplary embodiment according to FIG. 7, an additional sealing area 127 is formed from the foam rubber 106 of FIG. 6 in addition to the nose 126. The additional sealing area 127 is also formed from foam rubber 106. The additional sealing area 127 is formed between the nose 126 and the drip lip 112. The additional sealing area 127 also seals from below against the vehicle roof 101.

Figure 8:
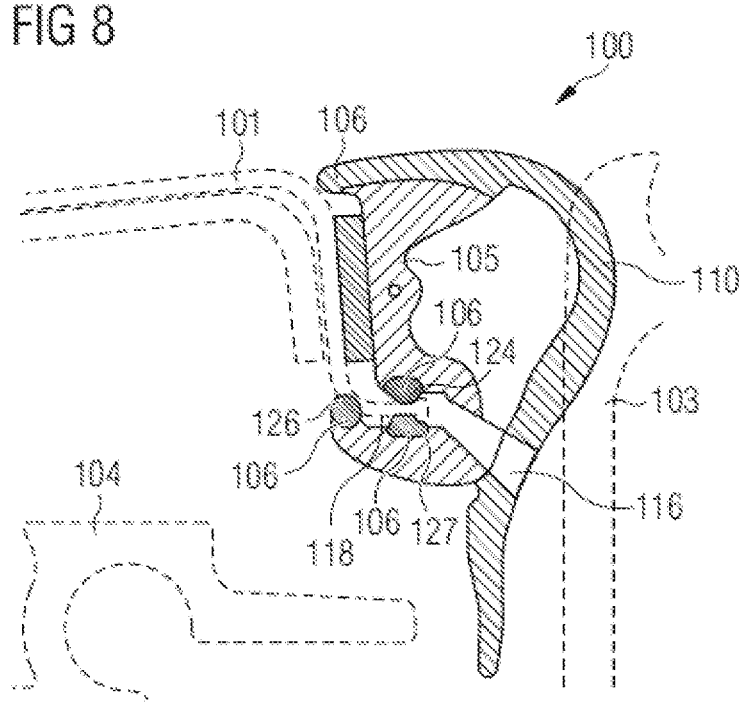

According to the exemplary embodiment in FIG. 8, in addition to the foam rubber seals 106 in FIG. 7, it is possible to form the nose 124, which presses on the vehicle roof 101 from above, from the softer foam rubber 106. The plug connection 108 is thus formed entirely from foam rubber 106. This leads to a higher level of sealing compared to the shell of the vehicle roof 101. The water is thus reliably conducted along the plug connection and particularly along the nose 124 as far as the recess 116. According to another exemplary embodiment, the nose 127 is eliminated and the plug connection 118 is formed with the noses 124 and 126.

Figure 9:
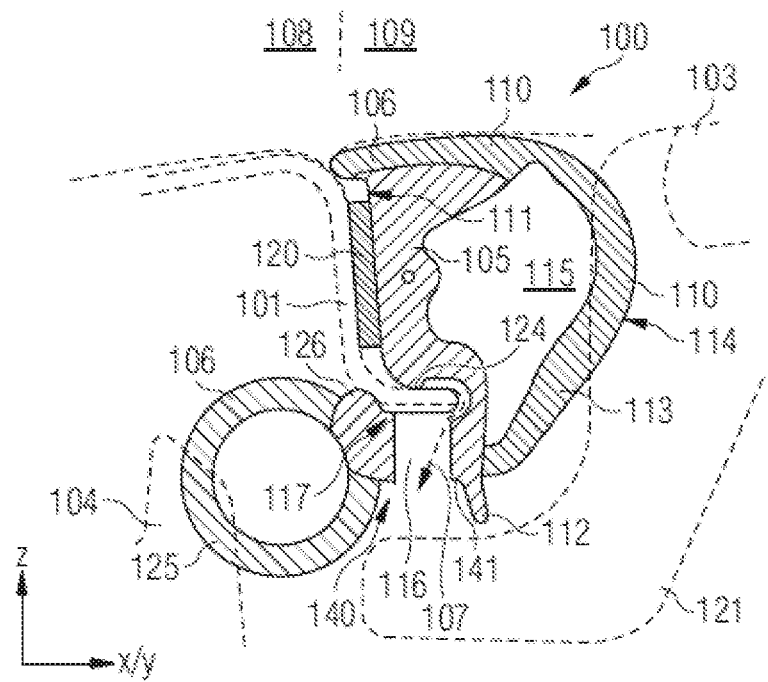

FIG. 9 shows the roof assembly 100 according to another exemplary embodiment. The exemplary embodiment according to FIG. 9 is essentially based on the roof assembly as explained in connection with FIG. 2. In contrast, the recess 116 is formed in the plug-in area 116. The recess 116 is drilled vertically along the z-direction into the sealing tube 113. The recess 116 is not fluid-connected to the hollow chamber 115. The risk of the water 107 flowing back into the hollow chamber 115 can thus be reduced. The recess 116 is arranged, for example, between the second sealing tube 125 and the drip lip 112. The recess 116 is arranged, for example, between the adhesive bond 120 and the drip lip 112. The recess 116 is arranged, for example, between the nose 126 and the drip lip 112. The recess 116 is arranged along the x-direction or the y direction on one side of the drip lip 112 facing away from the sealing side 114. The drip lip 112 is arranged between the recess 116 and the sealing side 114.

The recess 116 extends vertically along the vertical direction z in the region of the nose 124. The recess runs vertically between the roof frame 101 and the cover frame 121 in the position shown. The recess 116 is formed below the nose 124. The recess 116 is formed below the adhesive surface 119 of the sealing profile 110. The recess 116 is formed below the adhesive bond 120. The recess forms a fluidic connection between the fastening side 111 and a bottom side 141 of the sealing tube 113. The bottom side 141 faces away from the vehicle roof 101 and faces the cover frame 121 in the position shown. The bottom side 141 is formed on the side 140 of the sealing tube 113 facing away from the fastening side 111. The recess 116 is formed in the region of the sealing tube 113 which is formed from the solid 105.

Each sealing profile 110 according to the various exemplary embodiments has at least one recess 116 which is used for channeled drainage. Water 107, which is brought in through an improperly executed adhesive bond 120 along the adhesive surface 119 as far as the plug-in area 117, is thus conducted in a targeted manner into a water-draining area, for example into the water-conducting channel 130. The water that undesirably reaches the plug-in area 117 is thus prevented from reaching the dry area 108 and from spreading there in an undefined manner. Thus, the susceptibility of the overall system of the roof assembly 100 to errors is reduced, since water that penetrates due to a faulty adhesive bond 120 is drained off in a controlled manner.

The invention is not limited to the exemplary embodiments by the description thereof. Rather, the invention includes every new feature and every combination of features, which particularly includes every combination of features in the patent claims, even if this feature or this combination itself is not explicitly specified in the patent claims or exemplary embodiments. For example, it is possible to combine the various configurations of the plug connection 118 with the various noses from the individual figures with features from other figures. For example, it is additionally or alternatively possible to combine the different configurations of the recesses 116 with one another and with other features such as the various plug connections 118. For example, the sealing profile 110 has both at least one obliquely extending recess 116, as shown in FIGS. 2 to 8, and at least one vertically extending recess 116, as shown in FIG. 9. It is also possible for the sealing profile 110 to have only obliquely extending recesses 116, as shown in FIGS. 2 to 8. It is also possible for the sealing profile 110 to have only vertically extending recesses 116, as shown in FIG. 9.

The invention claimed is:

1. A roof assembly for a vehicle roof having a roof opening, comprising a movable roof element for optionally closing and at least partially uncovering the roof opening, a strand-shaped sealing profile adapted on a sealing side for sealing against the movable roof element and can be fastened to a fastening side on the vehicle roof, the sealing profile comprising: a sealing tube which is elongated along a longitudinal axis (X) and which surrounds a hollow chamber, a recess which extends transversely to the longitudinal axis (X) through the sealing tube, such that the fastening side is fluid-connected to a side of the sealing tube facing away from the fastening side;

wherein the sealing profile has a plug-in area on the fastening side to fasten the sealing profile by a plug connection on the vehicle roof, wherein the recess extends between the plug-in area and the sealing side; and wherein the sealing profile has an adhesive surface on which the first sealing profile is fastenable to the vehicle roof by an adhesive bond, wherein the recess extends between the adhesive surface and the sealing side.

2. The roof assembly according to claim 1, wherein the fastening side is fluid-connected to the sealing side by the recess.

3. The roof assembly according to claim 1, wherein the recess is fluid-connected to the hollow chamber.

4. The roof assembly according to claim 1, wherein the recess is inclined away from the hollow chamber, starting from the fastening side.

5. The roof assembly according to claim 1, wherein the sealing profile on the sealing side has a drip lip, wherein the recess is formed between the drip lip and the hollow chamber.

6. A roof assembly for a vehicle roof having a roof opening, comprising a movable roof element for optionally closing and at least partially uncovering the roof opening, a strand-shaped sealing profile adapted on a sealing side for sealing against the movable roof element and can be fastened to a fastening side on the vehicle roof, the sealing profile comprising:
- a sealing tube which is elongated along a longitudinal axis (X) and which surrounds a hollow chamber,
- a recess which extends transversely to the longitudinal axis (X) through the sealing tube, such that the fastening side is fluid-connected to a side of the sealing tube facing away from the fastening side;
- wherein the sealing profile has a plug-in area on the fastening side to fasten the sealing profile by a plug connection on the vehicle roof, wherein the recess extends between the plug-in area and the sealing side; and
- wherein a seal is formed on the plug connection such that water is conducted along the plug connection towards the recess.

7. The roof assembly according to claim 1, wherein the sealing profile has the plug-in area on the fastening side to fasten the sealing profile by a plug connection on the vehicle roof, wherein the recess is formed in the plug-in area.

8. The roof assembly according to claim 1, wherein the sealing profile on the sealing side has the drip lip, wherein the recess is formed on a bottom side facing away from the sealing side next the drip lip.

9. The roof assembly according to claim 1, wherein the recess is aligned along a vertical direction (z) in the operational state.

10. The roof assembly according to claim 1, wherein the sealing profile has a plurality of recesses which are formed at a distance from one another along the longitudinal axis (X) of the sealing profile.

11. A vehicle roof having a roof opening, comprising: a roof assembly according to claim 1, wherein the strand-shaped sealing profile is fastened to the vehicle roof and separates a dry area of the vehicle roof from a wet area, wherein the recess extends between the dry area and the wet area.

12. The vehicle roof according to claim 11, wherein the sealing profile is fastened to the vehicle roof by an adhesive bond, wherein the recess extends between the adhesive bond and the wet area.

13. The vehicle roof according to claim 11, wherein the sealing profile is fastened to the vehicle roof by a plug connection, wherein the plug connection is arranged between the adhesive bond and the recess.

14. A roof assembly for a vehicle roof having a roof opening, comprising a movable roof element for optionally closing and at least partially uncovering the roof opening, a strand-shaped sealing profile adapted on a sealing side for sealing against the movable roof element and can be fastened to a fastening side on the vehicle roof, the sealing profile comprising:
- a sealing tube which is elongated along a longitudinal axis (X) and which surrounds a hollow chamber,
- a recess which extends transversely to the longitudinal axis (X) through the sealing tube, such that the fastening side is fluid-connected to a side of the sealing tube facing away from the fastening side; and
- wherein the sealing profile has a drip lip on the sealing side and that the recess is arranged between an adhesive surface and the drip lip.

* * * * *